US007177991B2

(12) United States Patent
Yamamoto et al.

(10) Patent No.: US 7,177,991 B2
(45) Date of Patent: Feb. 13, 2007

(54) INSTALLATION METHOD OF NEW STORAGE SYSTEM INTO A COMPUTER SYSTEM

(75) Inventors: Yasutomo Yamamoto, Sagamihara (JP); Yoshiaki Eguchi, Machida (JP); Ai Satoyama, Sagamihara (JP); Hiroshi Ohno, Odawara (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 10/636,758

(22) Filed: Aug. 8, 2003

(65) Prior Publication Data
US 2004/0143832 A1    Jul. 22, 2004

(30) Foreign Application Priority Data
Jan. 16, 2003    (JP)    ............................. 2003-008821

(51) Int. Cl.
 G06F 12/00    (2006.01)
(52) U.S. Cl. .................. 711/161; 711/114; 711/162
(58) Field of Classification Search .............. 714/7; 711/163, 112, 154, 167
 See application file for complete search history.

(56) References Cited
U.S. PATENT DOCUMENTS

| | | |
|---|---|---|
| 3,771,137 A | 11/1973 | Bamer et al. |
| 4,025,904 A | 5/1977 | Adney et al. |
| 4,710,868 A | 12/1987 | Cocke et al. |
| 5,155,845 A | 10/1992 | Beal et al. |
| 5,408,465 A | 4/1995 | Gusella et al. |
| 5,459,857 A | 10/1995 | Ludlam et al. |
| 5,459,957 A | 10/1995 | Ludlam et al. |
| 5,504,882 A | 4/1996 | Chai et al. |
| 5,504,982 A | 4/1996 | Chai et al. |
| 5,548,712 A * | 8/1996 | Larson et al. .................. 714/7 |

(Continued)

FOREIGN PATENT DOCUMENTS

EP    1130514    9/2001

(Continued)

OTHER PUBLICATIONS

White Paper, "Network Attached Storage in the Data Protection Environment", Sony Electronics Inc., Feb. 2002, 23 pages.

(Continued)

*Primary Examiner*—Reginald Bragdon
*Assistant Examiner*—Thanh D. Vo
(74) *Attorney, Agent, or Firm*—Mattingly, Stanger, Malur & Brundidge, P.C.

(57) ABSTRACT

A new storage unit is installed such that installation costs are suppressed and functions of the new storage unit can be utilized sufficiently. An access right is changed such that the new storage unit (second storage unit) can access an existing first storage unit (S502). A logical device relating to a storage device of the first storage unit is assigned to a logical device of the second storage unit (S503). Path definition and device recognition in a host computer are performed such that the host computer can access the assigned logical device of the second storage unit (S504, 505). Input-output setting of the host computer is changed such that processing of an input-output from the host computer to the device of the first storage unit is requested to the second storage unit (S506). Seleted figure: FIG. 5.

19 Claims, 9 Drawing Sheets

U.S. PATENT DOCUMENTS

| | | |
|---|---|---|
| 5,680,580 A | 10/1997 | Beardsley et al. |
| 5,680,590 A | 10/1997 | Beardsley et al. |
| 5,680,640 A * | 10/1997 | Ofek et al. .................... 710/19 |
| 5,758,118 A * | 5/1998 | Choy et al. .................. 711/114 |
| 5,809,285 A | 9/1998 | Hilland |
| 5,835,954 A * | 11/1998 | Duyanovich et al. ........ 711/162 |
| 5,870,537 A | 2/1999 | Kern et al. |
| 5,895,485 A | 4/1999 | Loechel et al. |
| 5,895,495 A | 4/1999 | Loechel et al. |
| 5,917,723 A | 6/1999 | Binford |
| 5,956,750 A | 9/1999 | Yamamoto et al. |
| 5,978,890 A | 11/1999 | Ozawa et al. |
| 6,012,123 A | 1/2000 | Pecone et al. |
| 6,044,444 A | 3/2000 | Ofek |
| 6,098,129 A | 8/2000 | Fukuzawa et al. |
| 6,101,497 A | 8/2000 | Ofek |
| 6,108,748 A * | 8/2000 | Ofek et al. .................. 711/112 |
| 6,173,374 B1 | 1/2001 | Heil et al. |
| 6,195,730 B1 | 2/2001 | West |
| 6,209,002 B1 | 3/2001 | Gagne et al. |
| 6,219,753 B1 | 4/2001 | Richardson |
| 6,230,239 B1 * | 5/2001 | Sakaki et al. ................ 711/112 |
| 6,240,486 B1 * | 5/2001 | Ofek et al. .................. 711/112 |
| 6,240,494 B1 | 5/2001 | Nagasawa et al. |
| 6,247,099 B1 | 6/2001 | Skazinski et al. |
| 6,247,103 B1 | 6/2001 | Kern et al. |
| RE37,305 E | 7/2001 | Chang et al. |
| 6,341,329 B1 | 1/2002 | LeCrone et al. |
| 6,356,977 B2 | 3/2002 | Ofek et al. |
| 6,363,462 B1 | 3/2002 | Bergsten et al. |
| 6,446,141 B1 | 9/2002 | Nolan et al. |
| 6,446,175 B1 | 9/2002 | West et al. |
| 6,453,354 B1 | 9/2002 | Jiang et al. |
| 6,457,109 B1 | 9/2002 | Milillo et al. |
| 6,457,139 B1 * | 9/2002 | D'Errico et al. ................ 714/5 |
| 6,480,934 B1 | 11/2002 | Hino et al. |
| 6,484,173 B1 | 11/2002 | O'Hare et al. |
| 6,490,659 B1 | 12/2002 | McKean et al. |
| 6,523,096 B2 | 2/2003 | Sanada et al. |
| 6,529,976 B1 | 3/2003 | Fukuzawa et al. |
| 6,553,408 B1 | 4/2003 | Merrell et al. |
| 6,560,673 B2 | 5/2003 | Elliott |
| 6,587,935 B2 | 7/2003 | Ofek |
| 6,598,134 B2 * | 7/2003 | Ofek et al. .................. 711/162 |
| 6,622,220 B2 | 9/2003 | Yoshida et al. |
| 6,640,278 B1 | 10/2003 | Nolan et al. |
| 6,640,291 B2 * | 10/2003 | Fujibayashi et al. ........ 711/162 |
| 6,647,387 B1 | 11/2003 | McKean et al. |
| 6,647,414 B1 | 11/2003 | Yanai et al. |
| 6,647,474 B2 | 11/2003 | Yanai et al. |
| 6,647,476 B2 * | 11/2003 | Nagasawa et al. ........... 711/165 |
| 6,654,830 B1 | 11/2003 | Taylor et al. |
| 6,654,831 B1 | 11/2003 | Otterness et al. |
| 6,675,258 B1 | 1/2004 | Bramhall et al. |
| 6,675,268 B1 | 1/2004 | DeKoning et al. |
| 6,681,303 B1 | 1/2004 | Watanabe et al. |
| 6,681,339 B2 | 1/2004 | McKean et al. |
| 6,684,310 B2 | 1/2004 | Anzai et al. |
| 6,697,367 B1 | 2/2004 | Halstead et al. |
| 6,708,232 B2 | 3/2004 | Obara |
| 6,718,404 B2 | 4/2004 | Reuter et al. |
| 6,745,281 B1 | 6/2004 | Saegusa |
| 6,772,315 B1 | 8/2004 | Perego |
| 6,799,255 B1 | 9/2004 | Blumenau et al. |
| 6,816,948 B2 * | 11/2004 | Kitamura et al. ............ 711/152 |
| 6,826,778 B2 * | 11/2004 | Bopardikar et al. ......... 725/145 |
| 6,851,020 B2 | 2/2005 | Matsumoto et al. |
| 6,857,057 B2 | 2/2005 | Nelson et al. |
| 6,876,656 B2 | 4/2005 | Brewer et al. |
| 6,883,064 B2 | 4/2005 | Yoshida et al. |
| 6,922,761 B2 | 7/2005 | O'Connell et al. |
| 6,973,549 B1 | 12/2005 | Testardi |
| 6,976,103 B1 | 12/2005 | Watanabe et al. |
| 6,976,134 B1 | 12/2005 | Lolayekar et al. |
| 2001/0050915 A1 | 12/2001 | O'Hare et al. |
| 2001/0052018 A1 | 12/2001 | Yokokura |
| 2001/0054133 A1 | 12/2001 | Murotani et al. |
| 2002/0003022 A1 | 1/2002 | Csida et al. |
| 2002/0004857 A1 | 1/2002 | Arakawa et al. |
| 2002/0004890 A1 | 1/2002 | Ofek et al. |
| 2002/0019908 A1 | 2/2002 | Reuter et al. |
| 2002/0019920 A1 | 2/2002 | Reuter et al. |
| 2002/0019922 A1 | 2/2002 | Reuter et al. |
| 2002/0019923 A1 | 2/2002 | Reuter et al. |
| 2002/0026558 A1 | 2/2002 | Reuter et al. |
| 2002/0029326 A1 | 3/2002 | Reuter et al. |
| 2002/0065864 A1 | 5/2002 | Hartsell et al. |
| 2002/0087544 A1 | 7/2002 | Selkirk et al. |
| 2002/0087751 A1 | 7/2002 | Chong |
| 2002/0103889 A1 | 8/2002 | Markson et al. |
| 2002/0112113 A1 | 8/2002 | Karpoff et al. |
| 2002/0124108 A1 | 9/2002 | Terrell et al. |
| 2002/0133735 A1 | 9/2002 | McKean et al. |
| 2002/0156887 A1 | 10/2002 | Hashimoto |
| 2002/0156984 A1 | 10/2002 | Padovano |
| 2002/0156987 A1 | 10/2002 | Gajjar et al. |
| 2002/0178328 A1 | 11/2002 | Honda et al. |
| 2002/0178335 A1 | 11/2002 | Selkirk et al. |
| 2002/0188592 A1 | 12/2002 | Leonhardt et al. |
| 2002/0194428 A1 | 12/2002 | Green |
| 2002/0194523 A1 * | 12/2002 | Ulrich et al. .................... 714/4 |
| 2003/0033494 A1 | 2/2003 | Fujibayashi et al. |
| 2003/0037071 A1 | 2/2003 | Harris et al. |
| 2003/0051109 A1 | 3/2003 | Cochran |
| 2003/0056038 A1 | 3/2003 | Cochran |
| 2003/0093567 A1 | 5/2003 | Lolayekar et al. |
| 2003/0097607 A1 | 5/2003 | Bessire |
| 2003/0101228 A1 | 5/2003 | Busser et al. |
| 2003/0105931 A1 | 6/2003 | Weber et al. |
| 2003/0115218 A1 | 6/2003 | Bobbit et al. |
| 2003/0115432 A1 | 6/2003 | Biessener et al. |
| 2003/0126327 A1 | 7/2003 | Pesola et al. |
| 2003/0126388 A1 * | 7/2003 | Yamagami .................. 711/162 |
| 2003/0145168 A1 | 7/2003 | LeCrone et al. |
| 2003/0145169 A1 * | 7/2003 | Nagasawa et al. .......... 711/117 |
| 2003/0158999 A1 | 8/2003 | Hauck et al. |
| 2003/0163553 A1 | 8/2003 | Kitamura et al. |
| 2003/0167419 A1 | 9/2003 | Yanai et al. |
| 2003/0182525 A1 * | 9/2003 | O'Connell et al. ......... 711/162 |
| 2003/0189936 A1 | 10/2003 | Terrell et al. |
| 2003/0200387 A1 | 10/2003 | Urabe et al. |
| 2003/0204597 A1 | 10/2003 | Arakawa et al. |
| 2003/0204700 A1 | 10/2003 | Biessener et al. |
| 2003/0212854 A1 | 11/2003 | Kitamura et al. |
| 2003/0212860 A1 | 11/2003 | Jiang et al. |
| 2003/0221077 A1 | 11/2003 | Ohno et al. |
| 2003/0229645 A1 | 12/2003 | Mogi et al. |
| 2003/0229764 A1 | 12/2003 | Ohno et al. |
| 2004/0003022 A1 | 1/2004 | Garrison et al. |
| 2004/0028043 A1 | 2/2004 | Maveli et al. |
| 2004/0049553 A1 | 3/2004 | Iwamura et al. |
| 2004/0054850 A1 | 3/2004 | Fisk |
| 2004/0054866 A1 | 3/2004 | Blumenau et al. |
| 2004/0064610 A1 | 4/2004 | Fukuzawa et al. |
| 2004/0064641 A1 | 4/2004 | Kodama |
| 2004/0068637 A1 | 4/2004 | Nelson et al. |
| 2004/0073831 A1 | 4/2004 | Yanai et al. |
| 2004/0088417 A1 | 5/2004 | Bober et al. |
| 2004/0098547 A1 | 5/2004 | Ofek et al. |
| 2004/0111485 A1 | 6/2004 | Mimatsu et al. |
| 2004/0123180 A1 | 6/2004 | Soejima et al. |
| 2004/0139237 A1 | 7/2004 | Rangan et al. |
| 2004/0143832 A1 | 7/2004 | Yamamoto et al. |
| 2004/0148443 A1 | 7/2004 | Achiwa et al. |

| | | | |
|---|---|---|---|
| 2004/0158652 A1 | 8/2004 | Obara | |
| 2004/0158673 A1 | 8/2004 | Matsunami et al. | |
| 2004/0172510 A1 | 9/2004 | Nagashima et al. | |
| 2004/0230980 A1 | 11/2004 | Koyama et al. | |
| 2004/0260875 A1 | 12/2004 | Murotani et al. | |
| 2004/0260966 A1 | 12/2004 | Kaiya et al. | |
| 2005/0010734 A1* | 1/2005 | Soejima et al. | 711/163 |
| 2005/0010743 A1 | 1/2005 | Tremblay et al. | |
| 2005/0033878 A1 | 2/2005 | Pangal et al. | |
| 2005/0055501 A1 | 3/2005 | Guha et al. | |
| 2005/0081009 A1* | 4/2005 | Williams et al. | 711/163 |
| 2005/0138184 A1 | 6/2005 | Amir | |

FOREIGN PATENT DOCUMENTS

| | | |
|---|---|---|
| JP | 09-288547 | 11/1997 |
| JP | 10508967 | 9/1998 |
| JP | 10-283272 | 10/1998 |
| JP | 11-065980 | 3/1999 |
| JP | 2000-293317 | 10/2000 |
| JP | 2001-067187 | 3/2001 |
| JP | 2001-249853 | 9/2001 |
| JP | 2001-331355 | 11/2001 |
| JP | 2002-157091 | 5/2002 |
| JP | 2002-230246 | 8/2002 |
| WO | 9709676 | 3/1997 |
| WO | 03/023640 | 3/2003 |
| WO | 2003-027856 | 3/2003 |
| WO | 2003-027866 | 3/2003 |

OTHER PUBLICATIONS

"SCSI-3 Fault Tolerant Controller Configurations utilizing SCC & New Event Codes", Steve Sicola editor, High Availability Study Group, Rev. 3.0, Feb. 28, 1996, pp. 1-4.

Sarkar, P. et al, "Internet Protocol storage area networks", IBM Systems Journal, vol. 42, No. 2, 2003, pp. 218-231.

Anderson, Eric et al, "Hippodrome: running circles around storage administration", Hewlett-Packard Laboratories, 14 pp.

"SANRAD Application Note: Migrating Individual Servers to an iSCSI SAN", APP-004-01, SANRAD 2003, pp. 1-15.

"SANRAD Application Note: Data Migration Solution Transferring Data Between Storage Systems over Fibre-channel or SCSI connections", APP-003-03, SANRAD 2003, pp. 1-9.

"White Paper—Celerra Data Migration Service (CDMS)", EMC Corporation, Jan. 2002, pp. 1-13.

Meggyesi, Zoltan, "Fibre Channel Overview", High Speed Interconnect Project European Laboratory of Particle Physics (CERN), Aug. 1994, pp. 1-10.

* cited by examiner

FIG.2

LOGICAL DEVICE MANAGEMENT INFORMATION

CONFIGURATION INFORMATION OF LOGICAL DEVICE #0

| | |
|---|---|
| LOGICAL DEVICE NUMBER | 21 |
| SIZE | 22 |
| CORRESPONDING PHYSICAL/EXTERNAL DEVICE NUMBER | 23 |
| DEVICE STATE | 24 |
| PORT NUMBER/TARGET ID/LUN | 25 |
| CONNECTED HOST NAME | 26 |
| MIGRATING PHYSICAL/EXTERNAL DEVICE NUMBER | 27 |
| DATA MIGRATION PROGRESS POINTER | 28 |
| DATA MIGRATION PROCESSING FLAG | 29 |
| ⋮ | |

INSTALLATION METHOD OF NEW STORAGE SYSTEM INTO A COMPUTER SYSTEM

BACKGROUND OF THE INVENTION

1. Field of the Invention

The present invention relates to a storage unit that is installed newly into a computer system comprising a first storage unit and a host computer accessing the first storage unit, and an installation method thereof and an installation program therefor.

2. Related Art Statement

Recently, an amount of data treated by a computer is increasing by leaps, and accordingly storage capacity of a storage unit for storing data is increasing. As a result, costs of storage management in system management increase, and reduction of management costs becomes an important problem from the viewpoint of system operation.

When a new storage unit is installed into an existing computer system that comprises a host computer and a storage unit, two modes can be considered as a mode of installation, namely, a mode in which the old storage unit is used as ever, and the new storage unit is used together with the old storage unit, and a mode in which all the data on the old storage unit are migrated onto the new storage unit.

For example, as to the latter mode of installation, Japanese Patent Publication No. 10-508967 discloses a technique of migrating data of an old storage unit onto a new storage unit. According to the technique disclosed in the above document, data of a first device in the old storage unit are migrated onto a second device assigned to the new storage unit. Then, a host computer's access destination is changed from the existing first device to the new second device. An input-output request from the host computer to the existing first device is received by the new storage unit. With respect to a read request, a part whose migration is finished is read from the new second device, while a part that has not been migrated yet is read from the existing first device. Further, with respect to a write request, dual writing is performed toward both the first and second devices.

As described above, when a new storage unit is installed, it is possible to migrate data of a first device within an old storage unit to a second device within a new storage unit, without stopping input/output from/to a host computer.

However, in the case of the former mode of installation, where the new storage unit and the old storage unit are used side by side, there is a problem that, although generally the new storage unit has high function, high performance and high reliability in comparison with the old storage unit, it is impossible for data stored in the old storage unit to enjoy the merits of the new storage unit.

Further, in the case of the latter mode of installation, where all the data of the old storage unit are migrated onto the new storage unit, it is possible to enjoy the merits of the new storage unit by migrating the data stored in the old storage unit. However, there is a problem that, to migrate all the data of the old storage unit onto the new storage unit, the new storage unit must have more storage capacity than the old storage unit, and thus, the system installation cost is raised up.

Thus, as a compromise between them, it is possible to consider the following operation. Namely, the number of disk units mounted on a new storage unit is restrained to decrease initial investment, and the minimum data are migrated from an old storage unit to start system operation. At a stage in which a disk unit is added to the new storage unit, data is migrated from the old storage unit by an amount that the added disk unit allows. However, even by this compromise, data that can not be migrated because of storage capacity can not enjoy the merits of the new storage unit, similarly to the case where two storage units are used side by side.

SUMMARY OF THE INVENTION

An object of the present invention is to provide such a storage unit, an installation method thereof and an installation program therefor that can enjoy merits such as high function, high performance and high reliability of a new storage unit at the time of installation of the new storage unit, suppressing cost increase.

To attain the above object, the present invention follows the below-described procedures to install a new storage unit (referred to as a second storage unit) into a computer system comprising a host computer and an existing first storage unit, wherein the host computer and the first storage unit are connected through a first network such as SAN, LAN, or the like.

First, the new second storage unit is connected to the first network. Then, zoning setting of a switch existing in the first network and access right setting of the first storage unit are changed such that the second storage unit can access a storage device in the first storage unit. Next, a logical device (hereinafter, referred to as a first logical device) relating to the storage device of the first storage unit is assigned to a logical device (hereinafter, referred to as a second logical device) of the second storage unit. Namely, the first logical device of the first storage unit is associated with the second logical device of the second storage unit. Next, with respect to the second logical device, path definition and device recognition in the host computer are performed such that the host computer can recognize the second logical device of the second storage unit and can access the second logical device of the second storage unit.

Next, input-output setting of the host computer is changed such that processing of an input-output from the host computer to the storage device of the first storage unit is requested to the second storage unit. Here, the substance of the second logical device is the storage device in the first storage unit, and a storage device storing the data of the second logical device is not held in the second storage unit.

Favorably, the zoning setting of the switch existing in the first network and the access right setting of the first storage unit are changed such that direct access from the host computer to the storage device of the first storage unit is inhibited.

In the above-described state, when the second storage unit receives a read request from the host computer to the second logical device, then, the second storage unit converts the read request into a read request to the first logical device, and sends the converted request to the first storage unit. Receiving an input-output processing completion report from the first storage unit, the second storage unit sends the host computer a completion report relating to the input-output request to the second logical device.

Thus, in the above-described state, the second storage unit can process an input-output request to the storage device in the first storage unit. Accordingly, merits of the new storage unit, such as high performance, high reliability and high function, can be applied to the device in the existing first storage unit. For example, to the first logical device of the first storage unit, the second storage unit can apply a replicating function such as data replication and copy to a remote place, or access right control for each device.

Here, apparently the second logical device of the second storage unit is assigned to the first logical device of the first storage unit, and the host computer recognizes the first logical device of the first storage unit as the second logical device of the second storage unit. In this state, a physical device that becomes the substance of the second logical device is allocated from an unused storage space in the second storage unit, and a part or all of the data of the storage devices of the first storage unit are migrated. In the course of data migration, when a read request from the host computer to the second logical device relates to data that have not been migrated from the first logical device, then, this read request is sent to the first storage unit, as a read request to the first logical device. On the other hand, when this read request relates to data that have been migrated already, this read request is processed in the second storage unit, as a read request to the above-mentioned physical device as the subject of the second logical device. Further, with respect to a write request in the course of data migration, dual writing is performed toward the first logical device of the first storage unit and toward the physical device of the second storage unit. When the data migration from the first storage unit is finished, then setting is changed such that the physical device of the second storage unit is seen as the second logical device.

Thereafter, each time when a new storage device is added to the second storage unit, data of the first storage unit are migrated stepwise.

When the second storage unit is installed according to the above-described method, then, also with respect to data that are actually stored in the existing first storage unit, the host computer access the new second storage unit. Thus, merits of the new second storage unit, such as high performance, high functions, and high reliability of the second storage unit, can be enjoyed even when data actually stored in the existing first storage unit are accessed. In other words, the merits of the newly-installed storage unit can be applied to all the data including the data in the existing first storage unit. In addition, the existing storage unit and the new storage unit are used jointly, and storage capacity of the new storage unit can be smaller, and installation costs can be the smallest.

BRIEF DESCRIPTION OF THE DRAWINGS

FIG. 2 is a diagram showing an example configuration of a logical device management information table in an embodiment of the present invention;

BEST MODE OF PRACTICING THE INVENTION

Now, one embodiment of a computer system according to the present invention will be described.

Figure 1:
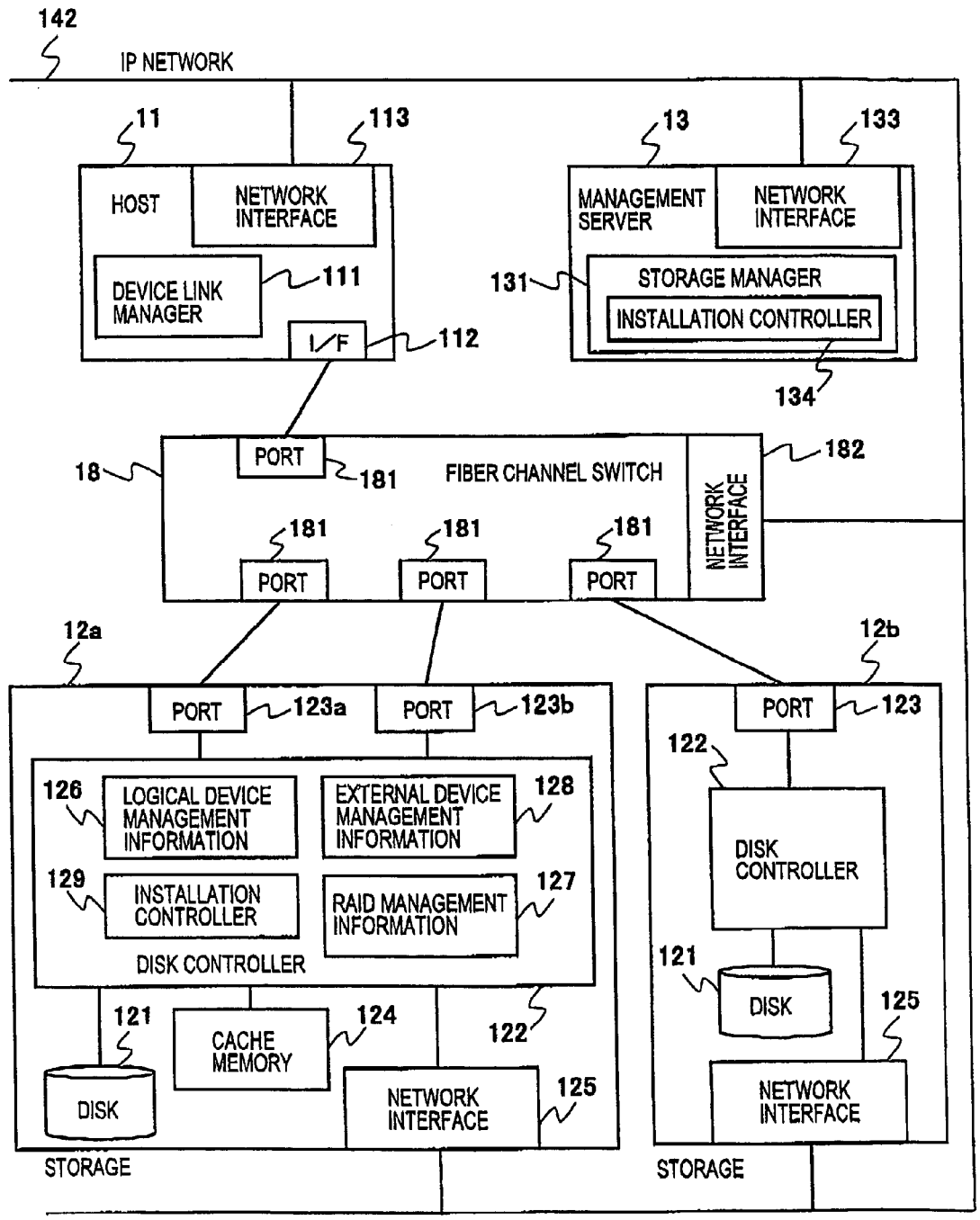
FIG. 1 is a block diagram showing a computer system as an embodiment of the present invention.

As shown in FIG. 1, a computer system of the present invention comprises a host computer 11, a fibre channel switch 18; two storage units 12a and 12b (referred to as a storage unit 12, by a general term) and a management server 13. The host computer 11 is connected with the two storage units 12a and 12b through the fibre channel switch 18 and cables. Further, the host computer 11, the two storage units 12a and 12b and the fibre channel switch 18 are connected to the management server 13 through an IP network 142.

The host computer 11 comprises a CPU, a memory, and the like, and performs predetermined functions when the CPU reads and executes an operating system (hereinafter, referred to as OS) and application programs stored in the memory.

Among the two storage units 12a and 12b, a first storage unit 12b is an existing storage unit, and a second storage unit 12a is a newly installed storage unit. The first storage unit 12b comprises a disk unit 121, a disk controller 122, a port 123 for connecting with the host computer 11, and a network interface 125 for connecting with the IP network 142. Here, the first storage unit 12b may comprise a plurality of disk units and a plurality of ports. Further, the second storage unit 12a comprises a plurality of disk units 121, a disk controller 122, a port 123a for connecting with the host computer 11 and a plurality of ports 123b for connecting with the other storage units (referred to as a port 128, by a general term), and a network interface 125 for connecting with the IP network 142.

In a storage unit 12 of the present embodiment, a disk unit or units 121 as hardware are defined collectively as one or a plurality of physical devices, and one logical device (i.e., one device from a logical viewpoint) is assigned to one physical device. Of course, it is possible to present an individual disk unit 121 as one physical device and one logical device, to the host computer 11.

As a port 123 of a storage unit 12 in the present embodiment, it is assumed to use the fibre channel interface whose upper protocol is SCSI (Small Computer System Interface). However, another network interface for storage connection, such as IP network interface whose upper protocol is SCSI, may be used.

A disk controller 122 of a storage unit 12 comprises a processor, a cache memory 124 and a control memory, and communicate with the management server 13 through the network interface 125 and controls the disk unit 121. The processor controls access from the host computer 11 and controls the disk unit 121, based on various kinds of information stored in the control memory, In particular, in the case where a plurality of disk units 121 (not a single disk unit 121) such as ones in a disk array are presented as one or plurality of logical devices to the host computer 11, the processor performs processing and management relating to the disk units 121.

The control memory stores programs executed by the processor and various kinds of management information. As one of the programs executed by the processor, there may be a disk controller program. This disk controller program includes an installation program for installing the second storage unit 12a into a computer system. This installation program and the disk controller program including it are executed by the processor to function as a storage installation controller 129 and the disk controller, respectively, Further, as the various kinds of management information stored or to be stored in the control memory, there may be logical device management information 126 for management of the logical devices of the second storage unit 12a; RAID (Redundant Array of Independent Disk) management information 127 for management of physical devices consisting of the plurality of disk units 121 of the second storage unit 12a, and external device management information 128 for management of correspondence between the logical devices of the second storage unit 12a and the logical devices of the first storage unit 12b To enhance speed of processing an access from the host computer 11, the cache memory 124 stores data that are frequently read, or temporally stores write data from the host computer 11.

The host computer 11 is connected with the fibre channel switch 18 through an interface (I/F) 112, and also with the management server through a network interface 113. On the host computer 11, software (program) called a device link manager (hereinafter, referred to as DLM) 111 operates. The DLM 111 manages correspondence between the logical devices (recognized through the interface 112) of the storage unit 12 and device files as device management units of the OS. Usually, when a logical device is connected with a plurality of interfaces 112 and a plurality of ports 123, the host computer 11 recognizes that logical device as a plurality of devices having different addresses, and different device files are defined, respectively. A plurality of device files corresponding to one logical device are managed as a group by the DLM 11, and a virtual device file as a representative of the group is provided to upper levels, so that alternate paths and load distribution can be realized. Further, in the present embodiment, the DLM 111 also adds/deletes a new device file to/from a specific device file group and changes a main path within a device file group, according to an instruction from a storage manager 131 located in the management server 13.

The management server 13 performs operation, maintenance and management of the whole computer system. The management server 13 comprises a network interface 133, and connects with the host computer 11, the two storage units 12a and 12b, and the fibre channel switch 18, through the IP network 142. The management server 13 collects configuration information, resource utilization factors, performance monitoring information from various units 11, 12 and 18, presents them to a storage administrator, and sends operation/maintenance instructions to those units. The mentioned processing is performed by the storage manager 131 operating on the management server 13.

Similarly to the disk controller 122, also the storage manager 131 comprises a processor and a memory. The memory stores a storage manager program executed by the processor. This storage manager program includes an installation program for installing a new storage unit, This installation program and the storage manager program including it are executed by the processor to function as an installation controller 134 and the storage manager 131, respectively. When a new storage unit is installed, this installation program is installed onto the existing management server 13, except the case where a new management server incorporated with the installation program is employed.

The fibre channel switch 18 comprises a plurality of ports 181. Each port 181 is connected with the interface 112 of the host computer 11 or a port 128 of the storage unit 12a or 12b, so that each of those devices can communicate with another device. The fibre channel switch 18 comprises a network interface 182, and is connected with the IP network 142 also. Due to this arrangement, from the physical viewpoint, any host computer 11 can access all the storage units 12a and 12b connected to the fibre channel switch 18. Further, the fibre channel switch 18 has a function called zoning, i.e., a function of limiting communication from a specific port to another specific port. This function is used, for example, when access to a specific port 128 of a specific storage 12 is limited to a specific host 11. As a method of controlling combinations of a sending port and a receiving port, may be mentioned a method in which an identifier assigned to a port 181 of the fibre channel switch is used, and a method in which WWN (World Wide Name) held by the interface 112 of each host computer 11 and a port 123 of a storage unit 12, for example.

Next, there will be described the logical device management information 126, the RAID management information 127 and the external device management information 128 stored or to be stored in the control memory of the disk controller 122 of the second storage unit 12a.

FIG. 2 is a diagram showing an example configuration of a logical device management information 126 for management of the logical devices within the second storage unit 12a.

Each record of the logical device management information 126 includes a logical device number 21, a size 22, a corresponding physical/external device number 23, a device state 24, a port ID/target ID/LUN (Logical Unit number) 25, a connected host name 26, a migrating physical/external device number 27, a data migration progress pointer 28, and a data migration processing flag 29.

The size 22 stores capacity of the logical device, i.e., the logical device specified by the logical device number 21. The corresponding physical/external device number 23 stores a physical device number of the physical device corresponding to the logical device, in the second storage unit 12a, or stores an external device number, i.e., a logical device of the first storage unit 12b corresponding to the logical device. In the case where the corresponding physical/external device number 23 is not assigned with a device number, an invalid value is set in that entry. This device number becomes an entry number in the RAID management information 127 or the external device management information 128. The device state 24 is set with information indicating a state of the logical device. The device state can be "online", "offline", non-installed, "fault offline" or "data migration in progress". The state "online" means that the logical device is operating normally, and can be accessed from an upper host. The state "offline" means that the logical device is defined and is operating normally, but, can not be accessed from an upper host. This state corresponds to a case where the device was used before by an upper host, but now is not used by the upper host since the device is not required. Here, the phrase "the logical device is defined" means that correspondence with a physical device or an external device is set, or, in detail, the physical/external device number 23 is set. The state "non-installed" means that the logical device is not defined and can not be accessed from an upper host. The state "fault offline" means that a fault occurs in the logical device and an upper host can not access that logical device. Further, the state "data migration in progress" means that data migration from or to an external device is in course of processing.

For the sake of simplicity, it is assumed in the present embodiment that, at the time of shipping of the product, available logical devices were assigned in advance to physical devices prepared on a disk unit 121. Accordingly, an initial value of the device state 24 is "offline" with respect to the available logical devices, and "non-installed" with respect to the other.

The port number of the entry 25 is set with information indicating which port the logical device is connected with, among the plurality of ports 123. As the port number, a number uniquely assigned to each port 123 within the storage unit 12 is used. Further, the target ID and LUN are identifiers for identifying the logical device. Here, when the host computer 11 accesses the device on SCSI, the target ID and LUN are used as a SCSI-ID and LUN, respectively. The connected host name 26 is information used only by the storage units 12a and 12b connected to the fibre channel switch 18, and shows a host name for identifying a host computer 11 that is permitted to access the logical device. As the host name, it is sufficient to use a name that can uniquely identify a host computer 11 or its interface 112, such as a WWN (World Wide Name) given to the interface 112 of a host computer 11. In addition, the control memory of the storage 12a or 12b holds management information on an attribute of a WWN and the like of each port 123.

When the device state 24 is "data migration in progress", the migrating physical/external device number 27 holds a physical/external device number of a migration destination of the physical/external device to which the logical device is assigned. The data migration progress pointer 28 is information indicating the first address of a migration source area for which migration processing is unfinished, and is updated as the data migration progresses. The data migration processing flag 29 has an initial value "Off". When the flag 29 is set to "On", it indicates that the physical/external device to which the logical device is assigned is under data migration processing. Only in the case where the data migration processing flag is "On", the migrating physical/external device number 27 and the data migration progress pointer 28 become effective.

Figure 3:
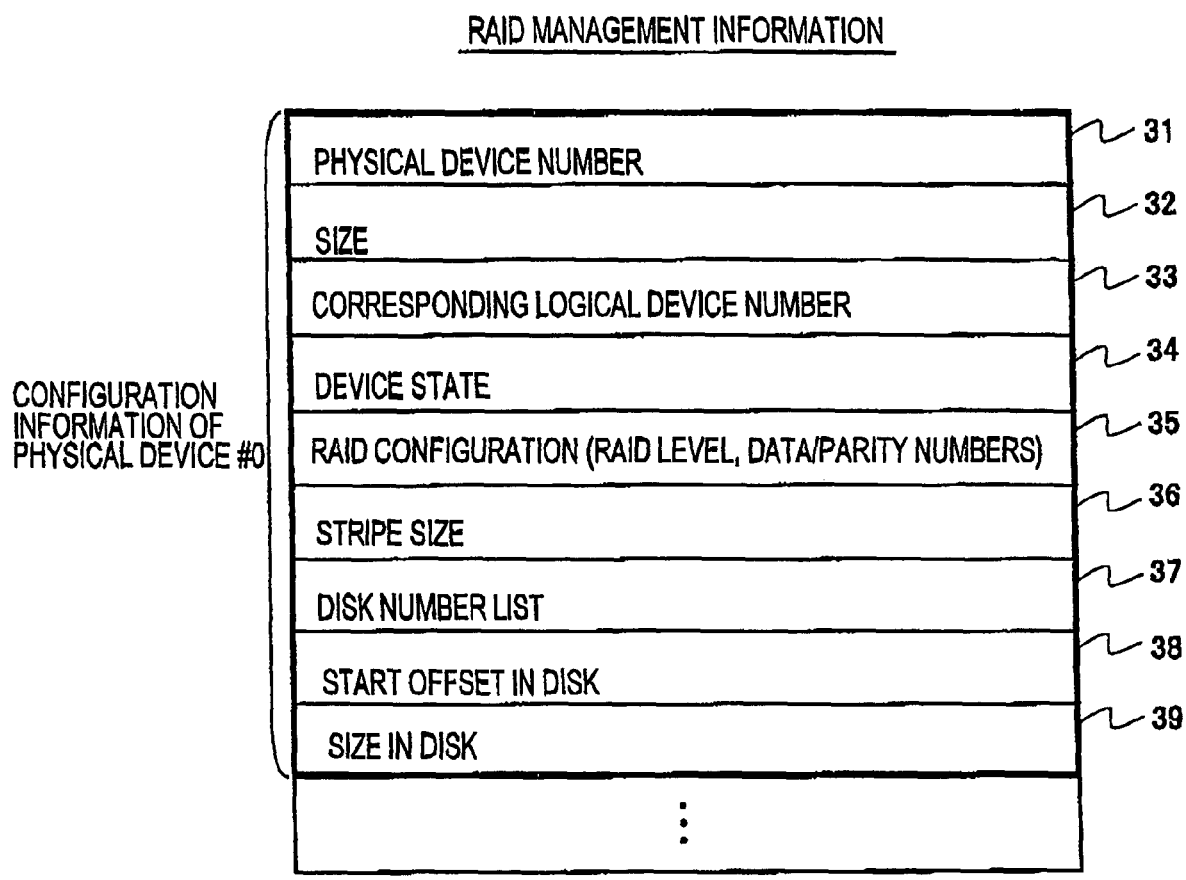
FIG. 3 is a diagram showing an example configuration of a RAID management information table in an embodiment of the present invention.

FIG. 3 is a diagram showing an example configuration of the RAID management information 127 for management of the physical devices within the storage unit 12a.

Each record of the RAID management information 127 includes a physical device number 31, a size 32, a corresponding logical device number 38, a device state 34, a RAID configuration 35, a stripe size 36, a disk number list 37, start offset in disk 38, and size in disk 39.

The size 32 stores capacity of the physical device, i.e., the physical device specified by the physical device number 31. The corresponding logical device number 38 stores a logical device number of the logical device corresponding to the physical device, within the second storage unit 12a. In the case where the physical device is got assigned with a logical device, this entry is set with an invalid value. The device state 34 is set with information indicating a state of the physical device. The device state can be "online", "offline", "non-installed" or "fault offline". The state "online" means that the physical device is operating normally, and is assigned to a logical device. The state "offline" means that the physical device is defined and is operating normally, but is not assigned to a logical device. Here, the phrase "the physical device is defined" means that correspondence with the disk unit 121 is set, or, in detail, the below-mentioned disk number list 37 and the start offset in disk 38 are set. The state "non-installed" means that the physical device is not defined on the disk unit 121. The state "fault offline" means that a fault occurs in the physical device, and the physical device can not be assigned to a logical device.

For the sake of simplicity, it is assume in the present embodiment that physical devices were prepared in advance on the disk unit 121 at the time of shipping of the product. Accordingly, an initial value of the device state 34 is "offline" with respect to the available physical devices, and "non-installed" with respect to the other.

The RAID configuration 36 holds information on a RAID configuration, such as a RAID level and the numbers of data disks and parity disks, of the disk unit 121 to which the physical device is assigned. Similarly, the stripe size 36 holds data partition unit (stripe) length in the RAID. The disk number list 37 holds a number or numbers of one or plurality of disk units 121 constituting the RAID to which the physical device is assigned. These numbers are unique values given to disk units 121 for identifying those disk units 121 within the storage unit 12. The start offset in disk 38 and the size in disk 39 are information indicating an area to which data of the physical device are assigned in each disk unit 121. In the present embodiment, for the sake of simplicity, the respective offsets and sizes in the disk units 121 constituting the RAID are unified.

Each entry of the above-described RAID management information 127 is set with a value, at the time of shipping the second storage unit 12a.

Figure 4:
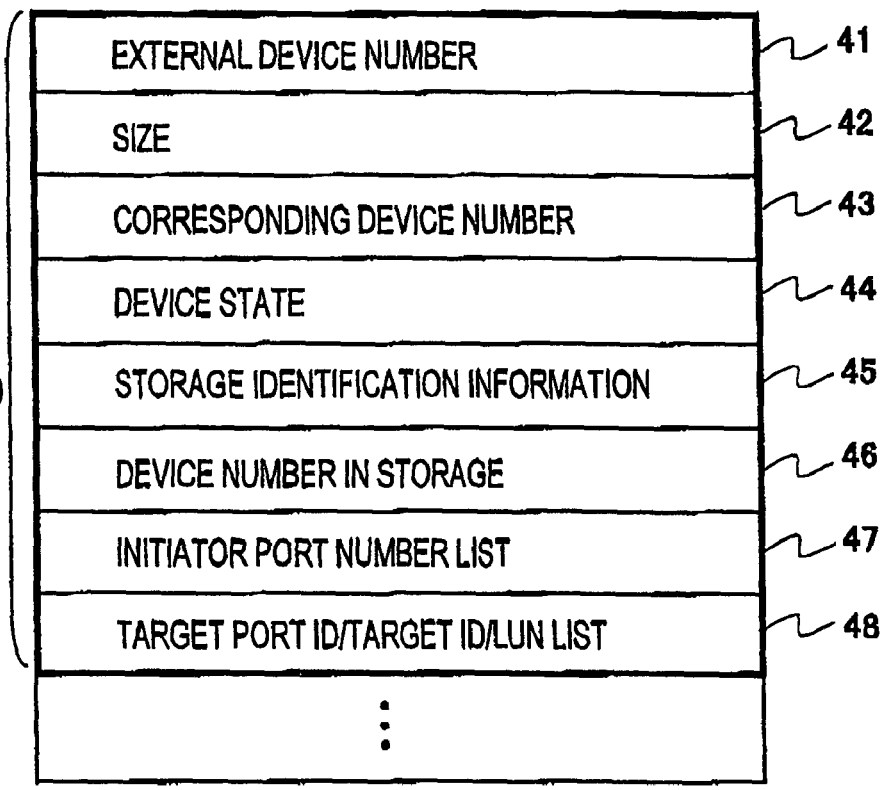
FIG. 4 is a diagram showing an example configuration of an external device management information table in an embodiment of the present invention.

FIG. 4 is a diagram showing an example configuration of the external device management information 128 of the second storage unit 12a that manages the logical devices of the first storage unit 12b as an external device.

Each record of the external device management information includes an external device number 41, a size 42, a corresponding logical device number 43, a device state 44, a storage identification information 45, a device number in storage 46, an initiator port number list 47, and a target port ID/target ID/LUN list 48.

The external device number 41 holds a valve assigned to a logical device of the first storage unit 12b, and this value is unique in the second storage unit 12a. The size 42 stores capacity of the external device, i.e., the external device specified by the external device number 41, When the external device corresponds to a logical device in the second storage unit 12a, the corresponding logical device number 43 stores a logical device number of that logical device. When the external device is not assigned to a logical device, this entry is set with an invalid value. The device state 44 is set with information indicating a state of the external device. The device state 44 is "online", "offline", "non-installed" or "fault offline". The meaning of each state is same as the device state 34 in the RAID management information. In the initial state of the second storage unit 12a, another storage unit is not connected, and the initial value of the device state 44 is "non-installed".

The storage identification information 46 holds identification information of the first storage unit 12b that carries the external device. As the storage identification information, may be considered, for example, a combination of vendor identification information on a vendor of the storage unit 12b and a manufacturer's serial number assigned uniquely by the vendor. The device number in storage 46 holds a logical device number (in the first storage unit 12b) corresponding to the external device. The initiator port number list 47 holds a list of port numbers of ports 123b (of the second storage unit 12a) that can access the external device. When, with respect to the external device, LUN is defined for one or more ports 123 of the first storage unit 12b, the target port ID/target ID/LUN list 48 holds port IDs of those ports and one or plurality of target IDs/LVNs assigned to the external device.

Next, operation of the storage administrator and the computer system following installation of the second storage unit 12a in the present embodiment will be described according to the flowchart shown in FIG. 5.

First, the storage administrator connects the second storage unit 12a to the fibre channel switch 18 (Step 501). In the present embodiment, the port 128a is connected to a port 181 of the fibre channel switch 18, for access from the host computer 11. And, the port 123b is connected to a port 181 of the fibre channel switch 18, for access to other storage units including the first storage unit 12b. When the second storage unit 12a is activated, the fibre channel switch 18 detects the established links with the ports 123a and 128b of the second storage units 12a. Thereafter, on occurrence of a login from each port 123a or 123b to the switch 18, a login to the interface or the port of the host computer 11 or the second storage unit 12a is executed according to the fibre channel standard. At that time, the second storage unit 12a holds information such as the WWN or ID of the host computer 11 or the like to which the port 123a or 123b has logged in. Receiving a state change notification from the switch 18, the installation controller 134 of the storage manager 131 acquires network topology information from the switch 18 again, to detect new registration of the second storage unit 12a.

Processing on and after the step 502 is performed mainly by the installation controller 134 of the storage manager 131 that receives an instruction from the storage administrator to start installation of the second storage unit 12a, and by the installation controller 129 of the second storage unit 12a. In the step 502, the installation controller 134 of the storage manager 131 changes zoning setting of the switch 18, and changes device access right setting of the first storage unit 12b such that the second storage unit 12a can access the devices of the first storage unit 12b.

In the step 508, the storage manager 131 assigns the logical devices of the first storage unit 12b to the logical device of the second storage unit 12a. In detail, first, the storage manager 131 sends the second storage unit 12a the port 11) list of the first storage unit 12b as the object of migration to the second storage unit 12a. From the port 123b, the installation controller 129 of the second storage unit 12a sends a SCSI "Inquiry" command that designates a specific LUN for a port 123 (of the first storage unit 12b) existing in the received list, with respect to all such LUNs. On the other hand, the processor of the first storage unit 12b responds normally to "Inquiry" commands relating to LUNs that are actually set to the port IDs of the first storage unit 12b. Based on this response, the installation controller 129 of the second storage unit 12a specifies the logical devices (of the first storage unit 12b) that can be accessed and migrated to the second storage unit 12a. And, the installation controller 129 generates an external device list (from the viewpoint of the second storage unit 12a) of those logical devices. To judge whether migration is possible or not, the installation controller 129 utilizes information such as names, types and capacities of devices connected to the second storage unit 12a. The information such as the names, types and capacities of the devices is acquired from returned information of the response to the above-mentioned "Inquiry" command and returned information of a response to "Read Capacity" command that is sent after the "Inquiry" command. With respect to logical devices (of the first storage unit 12b) whose migration has been judged to be possible, the installation controller 129 registers those logical devices as external devices of the second storage unit 12a into the external device management information 128. In detail, the installation controller 129 finds an external device whose device state 44 is "non-installed", and sets information 42~48 into the entries concerned of that external device. Now, the device state 44 is changed to "offline".

The installation controller 129 of the second storage unit 12a notifies the storage manager 131 of the above-mentioned external device list with respect to the designated port. And, the installation controller 134 of the storage manager 131 instructs the second storage unit 12a to assign the logical devices of the first storage unit 12b. Receiving this instruction, the installation controller 129 of the second storage unit 12a assigns an external device a, i.e., a logical device of the first storage unit 12b, to a non-installed logical device a of the second storage unit 12a. In detail, the installation controller 129 of the second storage unit 12a sets the device number 41 of the external device a to which the logical device of the first storage unit 12b corresponds, into the corresponding physical/external device number 23 of the logical device management information 126 relating to the logical device a. Then, the installation controller 129 of the second storage unit 12a changes the device state 24 of the logical device management information 126 from "non-installed" to "offline". In addition, the corresponding logical device number 43 of the external device management information 128 is set to the device number 21 of the logical device a, and the device state 44 is changed to "online".

Successively, in the step 504, the installation controller 134 of the storage manager 131 instructs the second storage unit 12a to define a LUN to the port 123a such that the host computer 11 can access the logical device a assigned to the second storage unit 12a. Receiving this instruction, the installation controller 129 of the second storage unit 12a defines a LUN relating to the above-assigned logical device a, i.e., defines a device path to the port 123a of the second storage unit 12a. Then, the port number/target ID/LUN 25 and the host name 26 of the logical device management information 126 are set.

When the logical device of the first storage unit 12b is assigned as the logical device of the second storage unit 12a, and also the LUN is defined, then, the installation controller 194 of the storage manager 131 instructs the DLM 111 of the host computer 11 to recognize the devices again. Receiving this instruction, the DLM 111 of the host computer generates a device file relating to the newly-assigned logical device. For example, in the case of the UNIX (a registered trademark) operating system of Hewlett-Packard Ltd., an "IOS-CAN" command is used to recognize a new logical device and to generate a device file. When the logical device of the storage unit 12 corresponding to the newly-generated device file is same as one corresponding to a previously-generated device file, then, the DLM 111 detect it and manages these device file as a same group. To judge the sameness, it is considered to use the above-mentioned "Inquiry" command or the like to acquire the device number in the storage 12, for example. However, in the case where a logical device b in the first storage unit 12b corresponds to a logical device a in the second storage unit 12a, the DLM 111 sees these logical devices a and b as logical devices of the different storage units 12a and 12b, they are not managed in a same group.

Next, the installation controller 134 of the storage manager 131 instructs the DLM 111 of the host computer 11 to change the access destination. Receiving this instruction, the DLM 111 changes access to the device in the first storage 12*b* to access to the device in the second storage unit 12*a* (Step 506). In detail, first, the installation controller 134 of the storage manager 131 sends device correspondence information of the first storage unit 12*b* and the second storage unit 12*a* to the DLM 111. The device correspondence information is information of the assignment of the logical devices of the second storage unit 12*b*. The DLM 111 of the host computer 11 assigns a virtual device file that is assigned to a device file group relating to a logical device b in the first storage unit 12*b* to a device file group relating to a logical device a in the second storage unit 12*a*. As a result, software operating on the host computer 11 can access the logical device a in the second storage unit 12*a* according to a same procedure of accessing the logical device b in the first storage unit 12*b*.

Next, in the step 507, the installation controller 134 of the storage manager 131 makes the switch 18 change the zoning setting and makes the first storage unit 12*b* change setting of the device access right, to inhibit the host computer 11 from directly accessing the devices of the first storage unit 12*b*.

Next, referring to the flowchart shown in FIG. 6, there will be described processing of migrating data stored in the devices in the first storage unit 12*b* to an empty device in the second storage unit 12*a*, after installation of the second storage unit 12*a* into the computer system.

First, the installation controller 134 of the storage manager 131 instructs the second storage unit 12*a* to migrate data. In the step 601, the installation controller 129 of the second storage unit 12*a* checks the device state 34 of the RAID management information 127, to search for a physical device a in the "offline" state, i.e., in an empty state. When a physical device in the "offline" state is found, then, the size 32 is referred to in order to obtain the capacity of the empty device. Next, in the step 602, the installation controller 129 searches for such an external device (hereinafter, referred to as the migration object device) that the device state 44 of the external device management information 128 is "online" and the size 42 of the external device management information 128 can be accommodated by the capacity of the physical device a.

When the empty physical device a as the migration destination and the migration object device are determined, then, in the step 603, the installation controller 129 assigns an empty physical device to the logical device a of the second storage unit 12*a* (Step 603). In detail, the installation controller 129 registers the number of the logical device a into the corresponding logical device number 33 of the RAID management information 127 corresponding to the physical device a, and changes the device state 34 from "offline" to "online", Further, after initializing the data migration progress pointer 28 of the logical device management information 126 corresponding to the logical device a, the device state 24 is set to "data migration in progress", the data migration processing flag 29 is set to "On", and the migrating physical/external device number 27 is set to the device number of the physical device a.

When the device assignment is finished, then, in the step 604, the installation controller 129 of the second storage unit 12*a* performs processing of data migration from the migration object device to the physical device a. In detail, from the top of the migration object device, data are read to the cache memory 124, and then, the data are written onto the physical device a. This operation is repeated to the end of the migration object device. In the course of this operation, each time when writing onto the physical device a is finished, the first address of the next migration object area is set into the data migration progress pointer 28.

When migration of all the data is finished, then, in the step 605, the installation controller 129 sets the corresponding physical/external device number 28 of the logical device management information 126 with the physical device number of the physical device a, and the device state 24 is changed from "data migration in progress" to "online", the data migration flag 29 is set to "Off", and the migrating physical/external device number 27 is set to the invalid value. Further, the corresponding logical device number 43 of the external device management information 128 corresponding to the migration object device is set to the invalid value, and the device state 44 is set to "offline".

Figure 7:
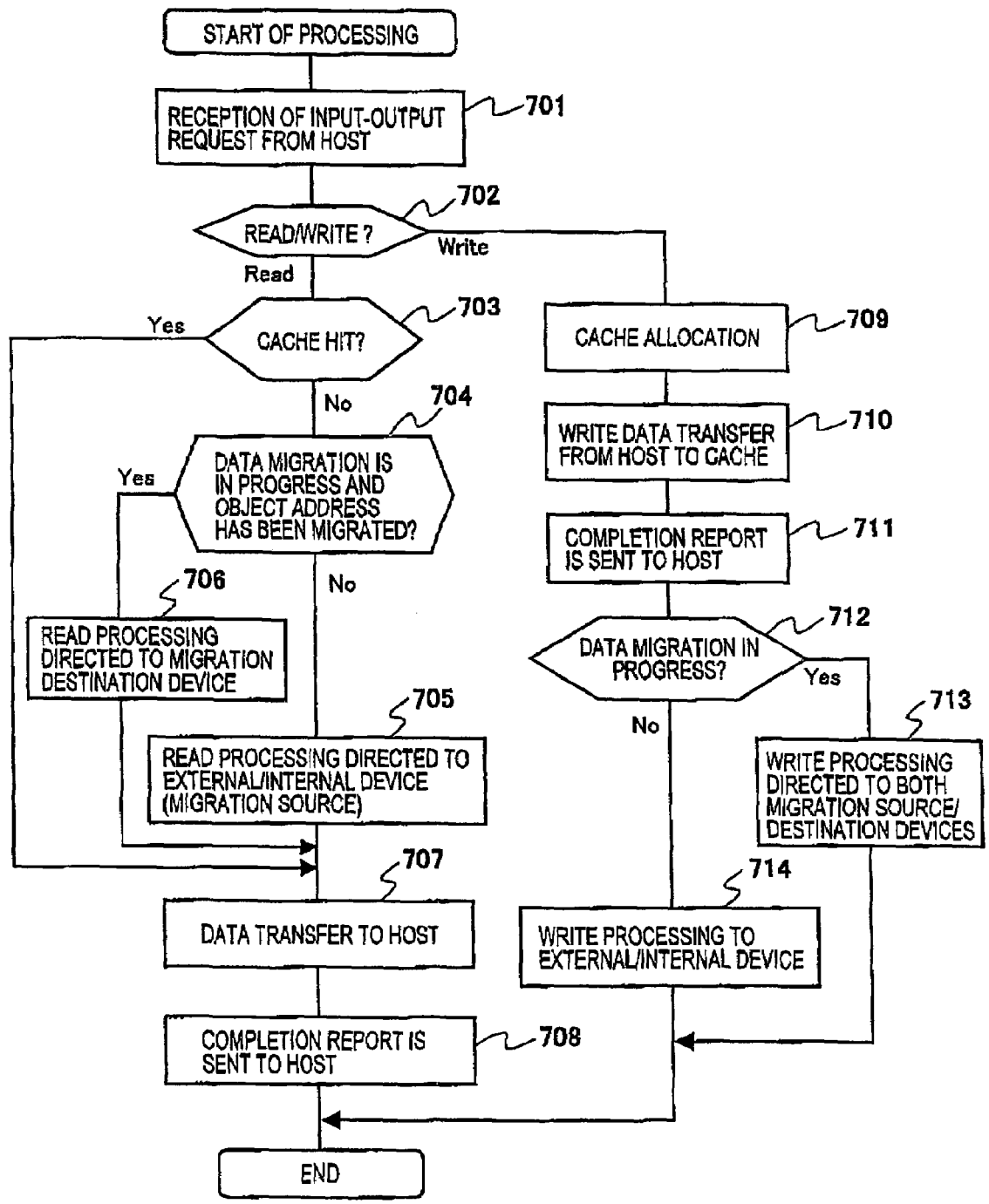
FIG. 7 is a flowchart showing a procedure of processing an input-output request from a host to a new second storage unit in an embodiment of the present invention.

Next, referring to the flowchart shown in FIG. 7, there will be described operation of the second storage unit 12*a* in response to an input-output request from the host computer 11.

When the installation controller 129 of the second storage unit 12*a* receives an input-output request from the host computer 11 (Step 701), the installation controller 129 judges whether the request is read or write (Step 702). In the case where the request is read, it is checked whether processing object data are held in the cache memory 124 (hit) (Step 703). When the processing object data are not held in the cache memory 124, data staging to the cache memory 124 is performed. At that time, it is judged whether the data migration is in progress, based on the device state 24 of the logical device in the logical device management information 126. When the data migration is in progress, then; it is judged whether a processing object address of the logical device as the processing object is in a migrated data area, based on the data migration progress pointer 28 relating to the logical device in the logical device management information 126 (Step 704). In the case where the data migration is in progress and data of the processing object area has been migrated already, then, read processing is performed for reading from the migration destination device indicated by the migrating physical/external device number 27 (Step 706). In the other case, read processing is performed for reading from the migration object device indicated by the corresponding physical/external device number 23 (Step 705).

In the read processing in the step 705, the installation controller 129 converts the read request from the host computer 11 into a read request to the migration object device indicated by the corresponding physical/external device number 23, and sends the converted request to the first storage unit 12*b*. Receiving this read request, the first storage unit 12*b* performs read processing toward the disk unit 121 corresponding to the above-mentioned migration object device, and sends read contents to the second storage unit 12*a*. Further, in the read processing in the step 706, the read processing is performed toward the migration object device indicated by the migrating physical/external device number 27.

When, after execution of the read processing (Step 705 or 706), the data staging to the cache memory 124 is finished, then, the object data held in the cache memory 124 is transferred to the host computer 11 (Step 707). And, the disk controller 122 of the second storage unit 12*a* sends a completion report to the host computer 11 (Step 708).

When it is judged in the step 703 that cache hit occurs, then, the object data held in the cache memory 124 are immediately transferred to the host computer 11 (Step 707).

When the data transfer to the host computer 11 is finished, the disk controller 122 of the second storage unit 12a sends a processing completion report to the host computer 11 (Step 708).

When it is judged in the step 702 that the input-output request from the host computer 11 is write, then, the disk controller 122 of the second storage unit 12a assigns a write data storage area to the cache memory 124, transfers write data from the host computer 11 to the cache memory 124, and sends a completion report to the host computer 11 (Steps 709–711). Thereafter, destaging of the write data is performed.

In the course of the destaging, it is judged whether the logical device is under data migration, based on the device state 24 of the logical device management information 126 (Step 712). When the logical device is under data migration, then, write processing of the above-mentioned data is performed toward both the migration source (migration object) device and the migration destination device (Step 713). On the other hand, when the logical device is not under data migration, write processing of the above-mentioned data is performed toward the device indicated by the corresponding physical/external device number 23 (Step 714).

Figure 8:
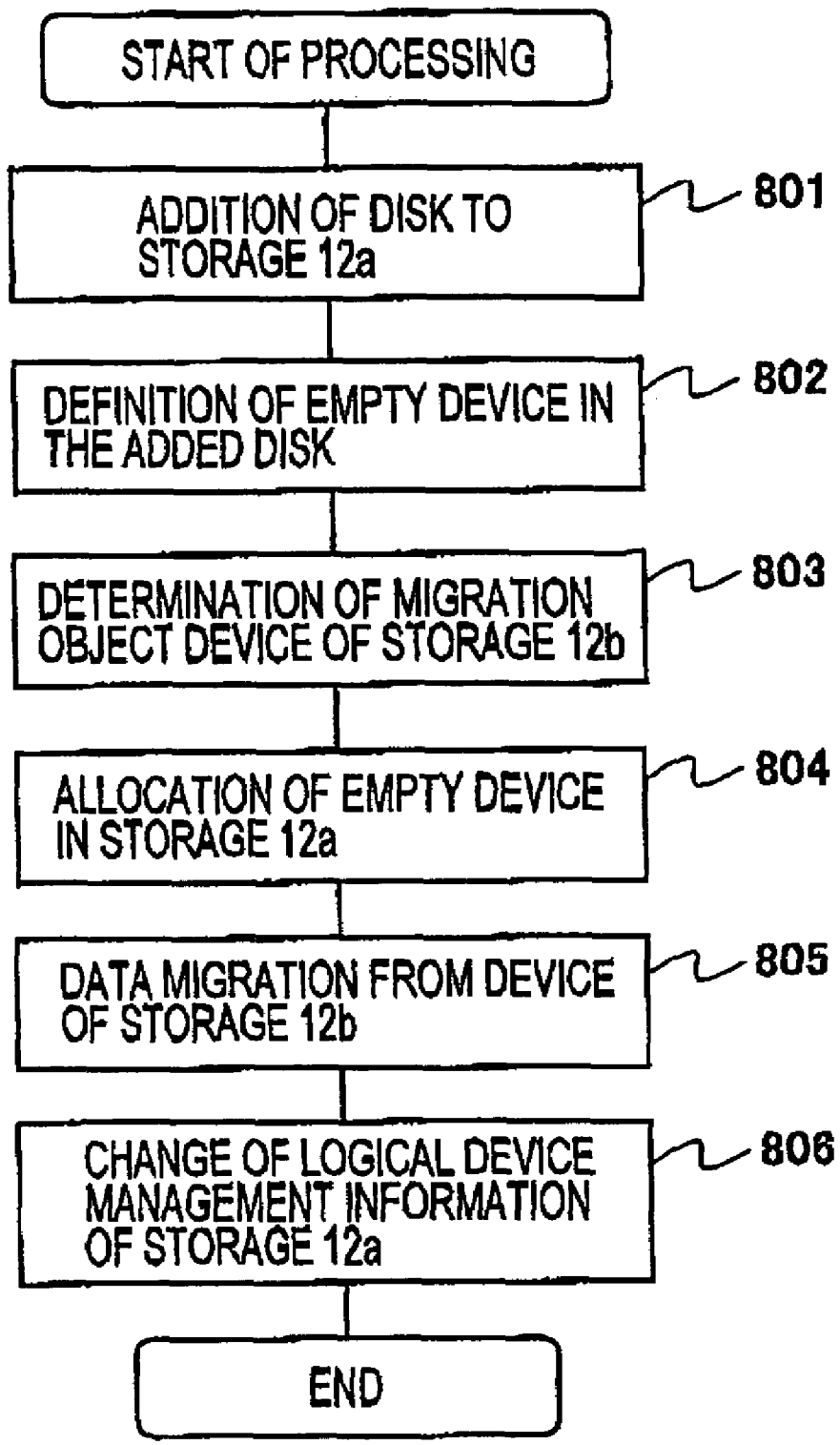
FIG. 8 is a flowchart showing a processing procedure at the time of adding a disk unit to a new second storage unit in an embodiment of the present invention.

Next, referring to the flowchart shown in FIG. 8, there will be described data migration processing in the case where a disk unit 121 is added to the second storage unit 12a, First, when the storage administrator adds a disk unit 121 to the second storage unit 12a, and the installation controller 129 of the second storage unit 12a detects this addition (Step 801), then, the installation controller 129 defines a new empty device, i.e., a physical device of an "offline" state (Step 802). At that time, the entries 32–39 of the RAID management information 127 are updated.

Thereafter, data migration of an external device whose data are not migrated yet is performed toward the newly-assigned empty device (Steps 803–806). These processes (Steps 803–806) are similar to the steps 602–605 of FIG. 6, and not described here again.

Hereinabove, an embodiment of the present invention has been described. However, the present invention is not limited to the above-described embodiment, and can be modified variously within the scope of the present invention.

Figure 5:
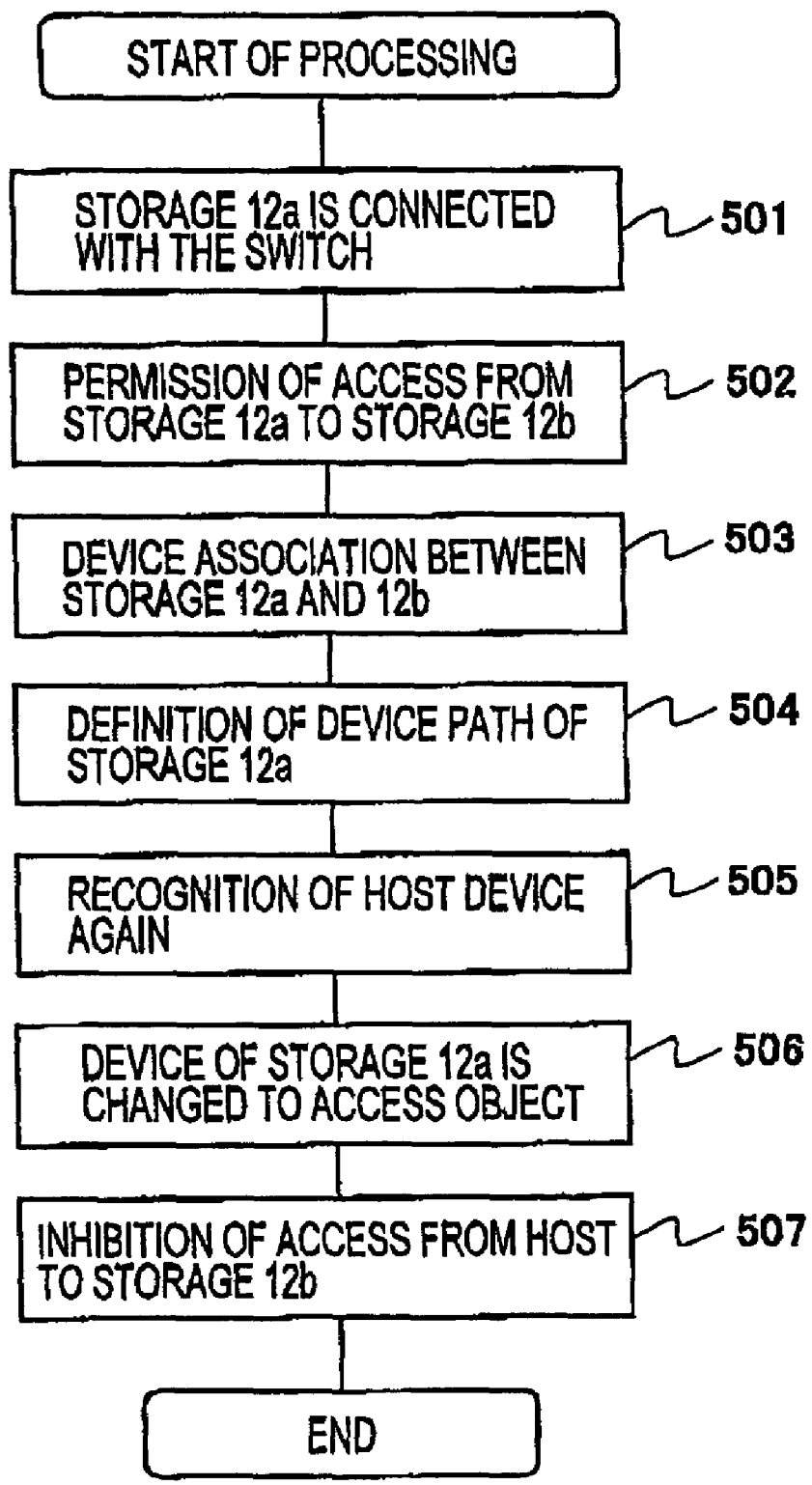
FIG. 5 is a flowchart showing a procedure of installing a new storage unit in an embodiment of the present invention.

For example, in the processing of installing the second storage unit 12a to the computer system, which has been described referring to FIG. 5, the port ID list of the first storage unit 12b as the migration object is sent from the storage manager 131 to the second storage unit 12a, in the step 503. However, instead of the port ID list, information that can specify the first storage unit 12b (for example, identification information list for identifying the unit name obtainable by an "Inquiry" command) may be sent. Identification information of the mentioned list is information required by the storage manager 131 to manage the first storage unit 12b, and although basically held inside the storage manager 131, may be obtained by sending an "Inquiry" command to the first storage unit 12b at the time of sending the list. In that case, the second storage unit 12a sends an "Inquiry" command to all the storage node ports that can be reached from the port 123b, and compares the above-mentioned identification information list with unit identification information among information obtained from the first storage unit 12b, so that only coincident ports become migration objects. Further, it is possible that the second storage unit 12a does not receive an instruction from the storage manager 131 and all the storage node ports reachable from the port 123b become migration objects.

Further, in the step 503 during installation processing of the second storage unit 12a, the storage manager 131 is notified of the list of the external devices detected by the second storage unit 12a, and only the external devices designated by the storage manager become the migration objects. However, it is possible that the second storage unit 12a does not notify the storage manager 131 of the detected external device list, and all the devices shown in the external device list become migration objects.

Further, in the step 503, the second storage unit 12a selects and assigns the no'non-installed logical device to the external device designated by the storage manager 131. However, the storage manager 131 may determine a non-installed logical device as an object of assignment and indicate the determined logical device to the second storage unit 12a. In that case, the storage manager 131 must obtain information such as the logical device number 21 and the device state 24 out of the logical device management information 126 shown in FIG. 2, to determine migration objects based on the obtained information.

Figure 6:
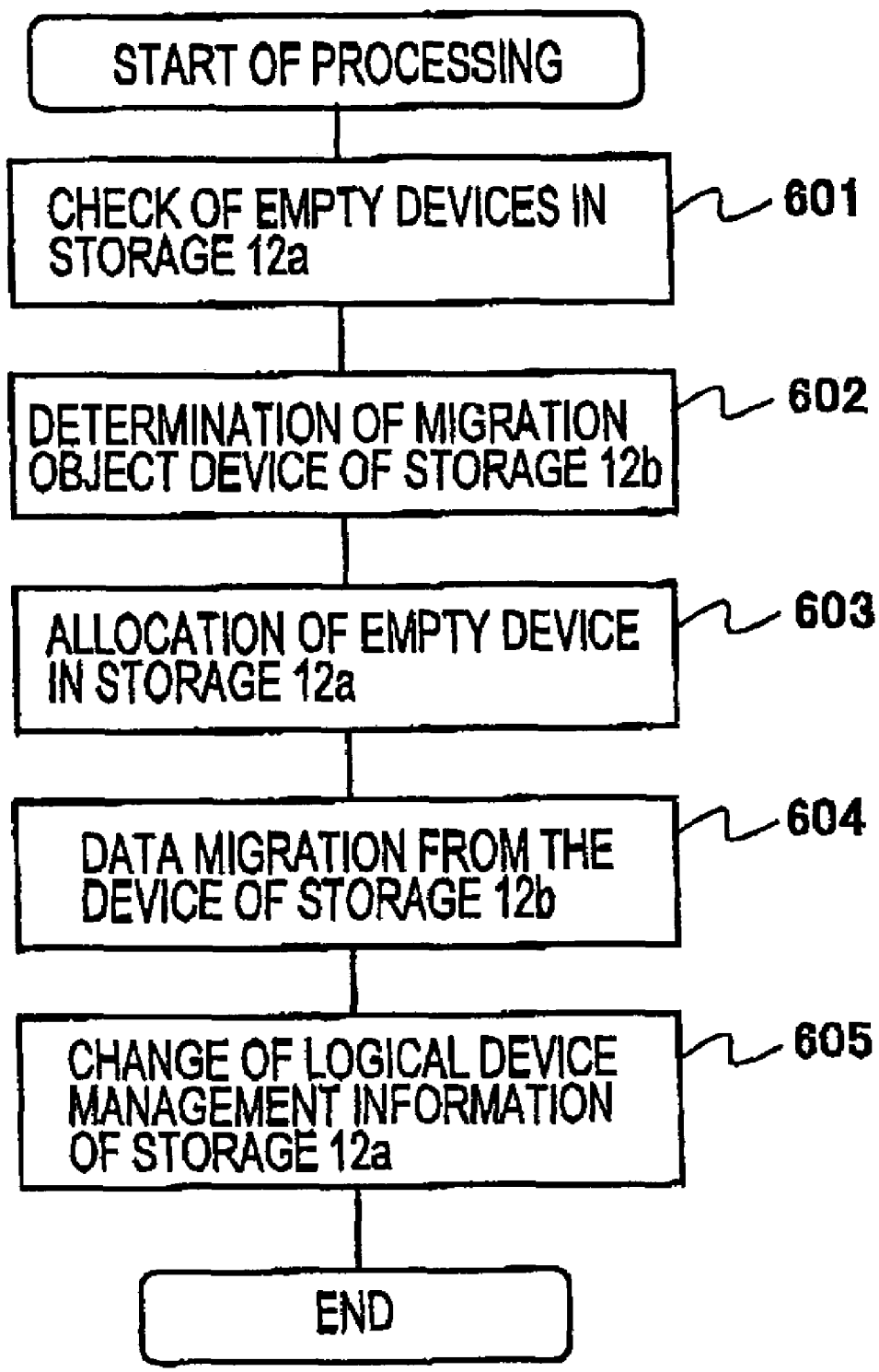
FIG. 6 is a flowchart showing a migration procedure at the time of migrating data from an existing first storage unit to a new second storage unit in an embodiment of the present invention.

Further, as described referring to the flowchart of FIG. 6, in the step 601 during the migration processing from an external device, i.e., a logical device of the first storage unit 12b, which is assigned to a logical device of the second storage unit 12a, to an empty physical device of the second storage unit 12a, the second storage unit 12a performs data migration from the external device to all the empty physical devices as the migration destination. However, it is possible to limit migration destination physical devices, based on control information that can be used to judge whether a physical device can be a migration object. In detail, a data migration target availability flag is provided to each record of the RAID management information shown in FIG. 3. This flag is set with a flag value indicating whether each physical device can become a data migration destination at the time of initialization or addition of a physical device. Based on this information, the second storage unit 12a specifies a physical device that can be a migration destination. Here, the mentioned flag value is set by the storage administrator using a configuration management terminal (not shown in FIG. 1) of the second storage unit 12a, or using an input-output unit such as a keyboard and/or a mouse provided to the storage manager 131. For example, it is possible to employ an arrangement in which a flag value is automatically set to "unavailable as migration target" as a basic set value given at the time of installation of a physical device, and the storage administrator changes the flag value relating to a specific physical device to "available as migration target". Or, it is possible to employ an arrangement in which, as the basic set value, the value "available as migration target" is set automatically, and the storage administrator changes the flag value relating to a specific physical device to "unavailable as migration target".

Further, it is possible that, with respect to a data migration instruction of the storage manager 131, the storage manager 131 holds physical device information such as the physical device number 31, the size 32 and the device state 34 out of the RAID management information 127 shown in FIG. 3, and specifies an empty physical device as the data migration destination, to the second storage unit 12a. In that case, in the data migration processing (shown in FIG. 6) of the second storage unit 12a, it is necessary to add a step in which it is checked whether the specified physical device is empty and the data migration request is rejected when the specified physical device is not empty.

Further, in the processing of the step 602 shown in FIG. 6, when the second storage unit 12a determines the migration object external device, the external device is determined by checking only whether it can be accommodated by the size of the empty physical device selected in the step 601. However, the migration object may be determined based on other information of the external device For example, it is possible that a data migration object possibility flag is provided to each record of the external device management information 128 shown in FIG. 4, and it is judged whether the external device can be an object of migration. In that case, when the external device management information 128 on an external device is registered in the step 503, the above-mentioned flag is initialized to have a value indicating possibility or impossibility of migration, and thereafter, the storage administrator changes the flag value. When the storage administrator changes the flag value, a configuration management terminal (not shown in FIG. 1) of the second storage unit 12*a*, or an input-output unit such as a keyboard and/or a mouse provided to the storage manager 131 may be used, Further, instead of the above-mentioned data migration object possibility flag, data migration object priority information may be provided. In that case, the second storage unit 12*a* determines the migration object external device, referring to the migration object priority information set by the storage administrator.

Figure 9:
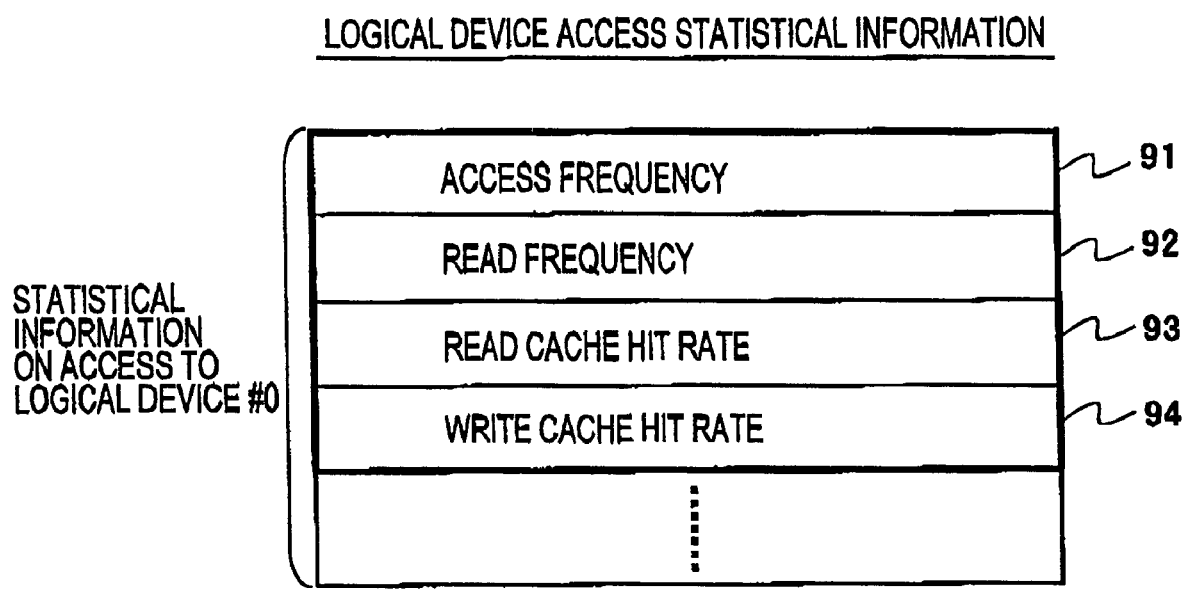
FIG. 9 is a diagram showing an example configuration of a logical device access statistical information table in an embodiment of the present invention.

Further, as a standard for determining a migration object external device, host access statistical information to the external device may be used, for example. In detail, the second storage unit 12*a* acquires access statistical information for each logical device. FIG. 9 shows an example of the statistical information. In each record of the access statistical information, an access frequency 91 indicates the number of accesses per time unit to the logical device, and a read frequency 92 indicates the number of reads per time unit from the logical device. A write frequency can be calculated from the access frequency 91 and the read frequency 92. A read cache hit rate 93 and a write cache hit rate 94 are hit rates in the cache memory 124 of the second storage unit 12*a* at the time of read access and at the time of write access, respectively. By combining these information items, it is possible to calculate an access frequency of each logical device to the corresponding external device (device of the first storage unit 12*b*). Here, as a data migration object, it is possible to select such an external device that has a higher access frequency and can be accommodated by the size of an empty device, based on thus-obtained access frequency for each external device.

Further, in the data migration processing shown in FIG. 6, the storage manager instructs the second storage unit 12*a* to perform data migration. However, the second storage unit 12*a* may automatically perform the data migration processing, as an extension of the processing of associating an external device, i,e., a logical device of the first storage unit 12*b*, with a logical device of the second storage unit 12*a*. Namely, out of the various functions of the installation controller 134 of the storage manager 131, the functions relating to the data migration processing shown in FIG. 6 may be mounted on the second storage unit 12*a*.

What is claimed is:

1. A storage system installation method for installing a second storage system into a computer system which includes a host computer and a first storage system which is coupled to the host computer, wherein the first storage system includes a first physical disk device, and the second storage system includes a second physical disk device and a disk controller coupled to the second physical disk device, said storage system installation method comprising the steps of:

coupling the second storage system to the host computer;

coupling the second storage system to the first storage system such that the second storage system can access the first storage system;

correlating a first logical device configured in at least the first physical disk device of the first storage system with a second logical device in the second storage system, the second logical device being provided to the host computer for transferring data from the host computer to the first logical device, wherein said second logical device is not assigned to any exclusive storage area of the second physical disk device of the second storage system;

defining a path between the second logical device and the host computer;

changing an access target of the host computer from the first logical device of the first storage system to the second logical device of the second storage system;

receiving a write request from the host computer to write data to the second logical device, wherein upon receiving the write request, the data is transferred by the disk controller of the second storage system to the first logical device of the first storage system; and writing, at the first storage system, the data received from the second storage system into the first physical disk device of the first storage system related to the first logical device.

2. The storage system installation method according to claim 1, further comprising a step of:

setting an access restriction that restricts an access from the host computer to the first storage system at the first storage system.

3. The storage system installation method according to claim 1, further comprising the steps of:

selecting, in the second storage system, the second physical disk device of the second storage system;

migrating data stored in the first logical device to the second physical disk device of the second storage system; and after completion of the data migration, correlating the second logical device with the second physical disk device instead of the first logical device.

4. The storage system installation method according to claim 3, further comprising the steps of:

receiving a read request for reading target data from the host computer at the second storage system during the data migration;

converting the received read request to another read request to the first logical device and transmitting the another read request to the first storage system if the target data of the received read request has not been migrated; and reading the target data of the received read request from the second physical disk device if the target data has already been migrated.

5. The storage system installation method according to claim 1, wherein the second storage system can access the first logical device of the first storage system based upon an access permission stored in said first storage system.

6. A computer program stored on a computer readable medium and executable by a computer for installing a second storage system into a computer system which includes a first storage system and a host computer which is coupled to the first storage system, wherein the first storage system includes a disk controller and a first physical disk device, and the second storage system includes a disk controller and a second physical disk device, said computer program comprising:

code that correlates a first logical device configured in at least the first physical disk device of the first storage system with a second logical device in the second storage system, the second logical device being provided to the host computer for transferring data from the host computer to the first logical device, wherein said second logical device is not assigned to any exclusive storage area of the second physical disk device of the second storage system;

code that sets an access permission that permits an access from the second storage system to the first storage system at the first storage system;

code that defines a path from the host computer to the second logical device;

code that pertains to transferring data, at the disk controller of the second storage system, from the host computer with a write request which instructs the disk controller of the second storage system to write the data into the second logical device to the first storage system; and code that pertains to writing the data, by the disk controller of the first storage system, received from the second storage system into the first physical disk device of the first storage system related to the first logical device.

7. The computer program according to claim 6, further comprising:

code that sets an access restriction that restricts an access from the host computer to the first storage system at the first storage system.

8. The computer program according to claim 6, further comprising:

code that changes a configuration of the host computer to issue an access request for data stored in the first logical device of the first storage system to the second storage system.

9. The computer program according to claim 6, further comprising:

code that selects, in the second storage system, the second physical disk device of the second storage system;

code that migrates data stored in the first logical device of the first storage system to the second physical disk device of the second storage system; and code that, after completion of the data migration, correlates the second logical device with the second physical disk device of the second storage system instead of the first logical device.

10. The computer program according to claim 9, further comprising:

code that receives a read request for reading target data from the host computer at the second storage system during the data migration;

code that converts the received read request to another read request for the first logical device and transmits the another read request to the first storage system if the target data of the received read request has not been migrated; and code that performs reading of the target data of the received read request from the second physical disk device of the second storage system if the target data has already been migrated.

11. A method of installing a second storage system into a computer system which includes a first storage system and a host computer which is coupled to the first storage system, wherein the first storage system includes a disk controller and a first physical disk device, and the second storage system includes a disk controller and a second physical disk device, said method comprising the steps of:

correlating a first logical device configured in at least the first physical disk devices of the first storage system with a second logical device of the second storage system, said second logical device is not assigned to any exclusive storage area of the second physical disk device of the second storage system;

setting an access permission that permits an access from the second storage system to the first storage system at the first storage system;

defining a path from the host computer to the second logical device;

transferring data to the first storage system, at the second storage system, the data being received from the host computer, with a write command which instructs the disk controller of the second storage system to store the data into the second logical device; and writing the data, at the disk controller of the first storage system, into the first physical disk device of the first storage system related to the first logical device.

12. The method according to claim 11, further comprising the steps of:

setting an access restriction that restricts an access from the host computer to the first storage system at the first storage system.

13. The method according to claim 11, further comprising the step of:

changing a configuration of the host computer to issue an access request for data stored in the first logical device of the first storage system to the second storage system.

14. The method according to claim 11, further comprising the steps of:

selecting, in the second storage system, the second physical disk device of the second storage system;

migrating data stored in the first logical device of the first storage system to the second physical disk device of the second storage system; and after completion of the data migration, correlating the second logical device with the second physical disk device of the second storage system instead of the first logical device.

15. The method according to claim 14, further comprising the steps of:

receiving a read request for reading target data from the host computer at the second storage system during the data migration;

converting the received read request to another read request for the first logical device and transmitting the another read request to the first storage system, if the target data of the received read request has not been migrated; and reading the target data of the received read request from the second physical disk device of the second storage system if the target data has already been migrated.

16. A storage system installation and data migration method for installing a second storage system between a host computer and a first storage system, wherein the first storage system includes a first physical disk device, and the second storage system includes a second physical disk device and a disk controller coupled to the at least one physical disk device, said storage system installation and data migration method comprising:

coupling the second storage system to the host computer;

coupling the second storage system to the first storage system so that the second storage system can access the first storage system;

correlating a first logical device configured in at least the first physical disk device of the first storage system with a second logical device in the second storage system the second logical device being provided for transferring data from the host computer to the first logical device, and said second logical device being not assigned to any exclusive storage area of the second physical disk device of the second storage system;

defining a path between the second logical device and the host computer;

changing an access target of the host computer from the first logical device of the first storage system to the second logical device of the second storage system;

after changing the access target, transferring data to the first storage system, the data being received at the second storage system from the host computer with a write request which instructs the disk controller of the second storage system to write the data into the second logical device;

writing, at the first storage system, the data received from the second storage system into the first physical disk device of the first storage system related to the first logical device;

after installation, selecting, in the second storage system, the second physical disk device of the second storage system in accordance with an instruction received by the disk controller of the second storage system;

migrating data in the first logical device to the second physical disk device of the second storage system after the selection step; and after completion of the data migration, correlating the second logical device in the second storage system with the second physical disk device in the second storage system instead of the first logical device in the first storage system.

17. The storage system installation and data migration method according to claim 16, further comprising:

setting an access restriction that restricts an access from the host computer to the first storage system in the first storage system.

18. The storage system installation and data migration method according to claim 17, further comprising:

receiving a read request for reading target data from the host computer at the second storage system during the data migration;

converting the received read request to another read request to the first logical device and transmitting the another read request to the first storage system if the target data of the received read request has not been migrated; and reading the target data of the received read request from the second physical disk device if the target data has already been migrated.

19. The storage system installation and data migration method according to claim 16, wherein the second storage system can access the first logical device of the first storage system based upon an access permission stored in said first storage system.

* * * * *